(12) United States Patent
Lee et al.

(10) Patent No.: US 7,407,317 B2
(45) Date of Patent: Aug. 5, 2008

(54) PRISM SHEET AND BACKLIGHT UNIT USING THE SAME

(75) Inventors: Man Hoan Lee, Kumi-shi (KR); Jae Kyung Kang, Gumi-si (KR); Ji Su Yoon, Seoul (KR); Sung Keun Lee, Kumi-shi (KR); Won Taek Moon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/314,342

(22) Filed: Dec. 22, 2005

(65) Prior Publication Data
US 2007/0002576 A1 Jan. 4, 2007

(30) Foreign Application Priority Data
Jun. 29, 2005 (KR) .................. 10-2005-0057014

(51) Int. Cl.
*F21V 7/04* (2006.01)
(52) U.S. Cl. .................. 362/620; 362/626; 362/622; 362/606; 362/607; 362/332
(58) Field of Classification Search .................. 362/620, 362/606–608, 327, 330, 621, 622, 332
See application file for complete search history.

(56) References Cited

U.S. PATENT DOCUMENTS

| 2,248,638 | A | 7/1941 | Merton |
| 4,542,449 | A | 9/1985 | Whitehead |
| 4,906,070 | A | 3/1990 | Cobb, Jr. |
| 5,056,892 | A | 10/1991 | Cobb, Jr. |
| 5,627,926 | A | 5/1997 | Nakamura et al. |
| 5,647,655 | A | * | 7/1997 | Kashima et al. ............ 362/606 |
| 5,816,677 | A | * | 10/1998 | Kurematsu et al. .......... 362/609 |
| 5,914,760 | A | * | 6/1999 | Daiku ........................ 349/65 |
| 6,024,462 | A | 2/2000 | Whitehead |
| 6,079,844 | A | * | 6/2000 | Whitehead et al. ............ 362/97 |
| 6,454,452 | B1 | * | 9/2002 | Sasagawa et al. ........... 362/561 |
| 6,851,815 | B2 | * | 2/2005 | Lee ............................ 362/23 |
| 6,876,408 | B2 | * | 4/2005 | Yamaguchi .................. 349/57 |
| 2002/0105793 | A1 | * | 8/2002 | Oda et al. ..................... 362/31 |
| 2005/0007513 | A1 | 1/2005 | Lee et al. |
| 2005/0046321 | A1 | * | 3/2005 | Suga et al. .................. 313/112 |
| 2005/0105282 | A1 | * | 5/2005 | Yu et al. ...................... 362/31 |
| 2006/0050534 | A1 | * | 3/2006 | Lee et al. .................... 362/620 |

FOREIGN PATENT DOCUMENTS

| EP | 1 486 802 A1 | 12/2004 |
| JP | 09-281310 | 10/1997 |
| JP | 2004-361821 | 12/2004 |

\* cited by examiner

*Primary Examiner*—Ali Alavi
*Assistant Examiner*—Evan Dzierzynski
(74) *Attorney, Agent, or Firm*—McKenna Long & Aldridge LLP

(57) ABSTRACT

A prism sheet capable of achieving an enhancement in light efficiency and viewing angle characteristics and a backlight unit using the prism sheet are disclosed. The prism sheet includes: a condensing film which transmits light incident to the condensing film; a plurality of prism crests on the condensing film having apexes; and a plurality of reflection patterns formed on the condensing film such that each of the reflection patterns faces a boundary of adjacent prism crests associated with the reflection pattern to reflect light incident onto the reflection patterns.

18 Claims, 9 Drawing Sheets

PRISM SHEET AND BACKLIGHT UNIT USING THE SAME

This application claims the benefit of the Korean Patent Application No. 2005-57014, filed on Jun. 29, 2005 which is hereby incorporated by reference as if fully set forth herein.

BACKGROUND OF THE INVENTION

1. Field of the Invention

The present invention relates to a back light unit, and more particularly, to a prism sheet capable of achieving an enhancement in light efficiency and viewing angle characteristics and a backlight unit using the prism sheet.

2. Discussion of the Related Art

Recently, various flat panel display devices have been developed which can eliminate disadvantages of cathode ray tubes (CRTs) caused by the bulky and heavy structures thereof. Such flat panel display devices include a liquid crystal display (LCD), a field emission display (FED), a plasma display panel (PDP), and a light emitting display (LED).

Of such flat panel display devices, the LCD displays a desired image by adjusting the transmission level of light beams irradiated from a backlight unit using a liquid crystal panel including a plurality of liquid crystal cells and a plurality of control switches to apply video signals to the liquid crystal cells.

FIG. 1 is a schematic view illustrating a conventional backlight unit.

Referring to FIG. 1, the conventional backlight unit includes a lamp 10 that emits light, a light guide plate 20 that receives the light emitted from the lamp 10, and emits the light across the surface area, and a lamp housing 12 that encloses an incidence face 22 of the light guide plate 20 and the lamp 10. The conventional backlight unit also includes a reflection plate 30 that is arranged beneath the light guide plate 20, a diffusion sheet 40 that is arranged above the light guide plate 20 to diffuse light emerging from the light guide plate 20, and a prism sheet 50 which adjusts the propagation direction of light emerging from the diffusion sheet 40.

Generally, the lamp 10 is formed of a cold cathode fluorescent lamp. The lamp 10 is turned on by a lamp drive voltage supplied from an inverter not shown, to irradiate light to the incidence face 22 of the light guide plate 20 provided at one side of the light guide plate 20.

The lamp housing 12 is arranged at one side of the light guide plate 20 to enclose the lamp 10 and the incidence face 22 of the light guide plate 20. The lamp housing 12 has on an inner surface a reflection face to reflect the light from the lamp 10 toward the incidence face 22 of the light guide plate 20.

The light guide plate 20 enables the incidence light from the lamp 10 to reach a position spaced apart from the lamp 10 by a great distance, and guides the incidence light toward the diffusion sheet 40. A printed pattern is provided at an inclined lower surface of the light guide plate 20 to form an inclined reflection face, so that light incident to the incidence face 22 is reflected from the inclined reflection face of the light guide plate 20 at a certain angle such that the light travels uniformly toward the diffusion sheet 40.

The reflection plate 30 is arranged beneath the light guide plate 20 in order to reflect light incident thereto from the reflection face of the light guide plate 20 toward the light guide plate 20, and thus, to reduce loss of light.

The diffusion sheet 40 diffuses the light emerging from the light guide plate 20 over the entire region of the diffusion sheet 40, and irradiates the diffused light to the prism sheet 50.

The prism sheet 50 functions to condense the light emerging from the diffusion sheet 40. To this end, the prism sheet 50 includes a condensing film 52 made of polyester (PET), and prism crests 54 formed on an upper surface of the condensing film 52 in the form of stripes, as shown in FIG. 2.

Each prism crest 54 has first and second inclined faces each having a certain inclination from the apex of the prism crest 54. For example, each of the first and second inclined faces is inclined by about 45° from the upper surface of the condensing film 52.

When it is assumed that the condensing film 52 of the prism sheet 50 has a refractive index n1, and the outside of the prism sheet 50 has a refractive index n2, light incident to the condensing film 52 at an angle θ1 is refracted at an angle θ2 at the prism crests 54 in accordance with Snell's Law, as expressed by the following equation 1, and is then emitted to the outside of the prism sheet 50.

$$\frac{n1}{n2} = \frac{\sin\theta 1}{\sin\theta 2} \qquad \text{equation 1}$$

In the above-mentioned conventional backlight unit, light emitted from the lamp 10 advances toward the diffusion sheet 40 arranged above the light guide plate 20 via the light guide plate 20. The light emerging from the light guide plate 20 is diffused by the diffusion sheet 40 over the entire region of the prism sheet 50. The diffused light is condensed while passing through the prism sheet 50, and is then externally emitted.

In the above-mentioned conventional backlight unit, however, the light incident to the prism sheet 50 may be divided into those of three regions, namely, a full reflection region, a condensing region, and a side lobe region, as shown in FIG. 3.

The light in the full reflection region, namely, light A vertically incident to the condensing film 52, is fully reflected by the first and second inclined faces of the prism crests 54, so that the light A is directed back to the light guide plate 20. Thus, the light A is condensed after being recycled.

The light in the condensing region, namely, light B incident to the condensing film 52 at a certain angle, is refracted by the first and second inclined faces of the prism crests 54, so that the light B is condensed.

On the other hand, light in the side lobe region, namely, light C incident to the condensing film 52 at a certain angle, is fully reflected by the first inclined face of the prism crests 54, so that the light C causes a degradation in light efficiency and a degradation in viewing angle characteristics.

For this reason, there are bright regions in the prism sheet 50 at opposite sides of a center line of the prism sheet 50, as shown in FIG. 4.

Thus, the conventional backlight unit has problems caused by the structure of the prism sheet 50, namely, viewing angle asymmetry caused by brightness asymmetry and a degradation in light efficiency caused by side lobes.

SUMMARY OF THE INVENTION

Accordingly, the present invention is directed to a prism sheet and a backlight unit using the same that substantially obviate one or more problems due to limitations and disadvantages of the related art.

An advantage of the present invention is to provide a prism sheet capable of achieving an enhancement in light efficiency and viewing angle characteristics, and a backlight unit using the prism sheet.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a prism sheet includes: a condensing film which transmits light incident to the condensing film; a plurality of prism crests on the condensing film having apexes; and a plurality of reflection patterns formed on the condensing film such that each of the reflection patterns faces a boundary of adjacent prism crests associated with the reflection pattern to reflect light incident onto the reflection patterns.

In another aspect of the present invention, a backlight unit includes: a lamp that emits light; a light guide plate that receives the light emitted from the light, and changes a path direction of the light to a direction substantially perpendicular to an upper surface of the light guide plate; and a prism sheet that condenses the light emerging from the light guide plate, wherein the prism sheet includes: a condensing film that transmits the light emerging from the light guide plate; a plurality of prism crests on the condensing film having apexes; and a plurality of reflection patterns formed on the condensing film such that each of the reflection patterns faces a boundary of adjacent prism crests associated with the reflection pattern to reflect light incident onto the reflection patterns.

In another aspect of the present invention, a backlight unit includes: a plurality of lamps that emit light; a bottom cover that receives and supports the lamps; a diffusion plate that covers an upper surface of the bottom cover and diffuses light emitted from the lamps; and a prism sheet that condenses light emerging from the diffusion plate, wherein the prism sheet includes: a condensing film that transmits the light emerging from the light guide plate; a plurality of prism crests on the condensing film having apexes; and a plurality of reflection patterns formed on the condensing film such that each of the reflection patterns faces a boundary of adjacent prism crests associated with the reflection pattern to reflect light incident onto the reflection patterns.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
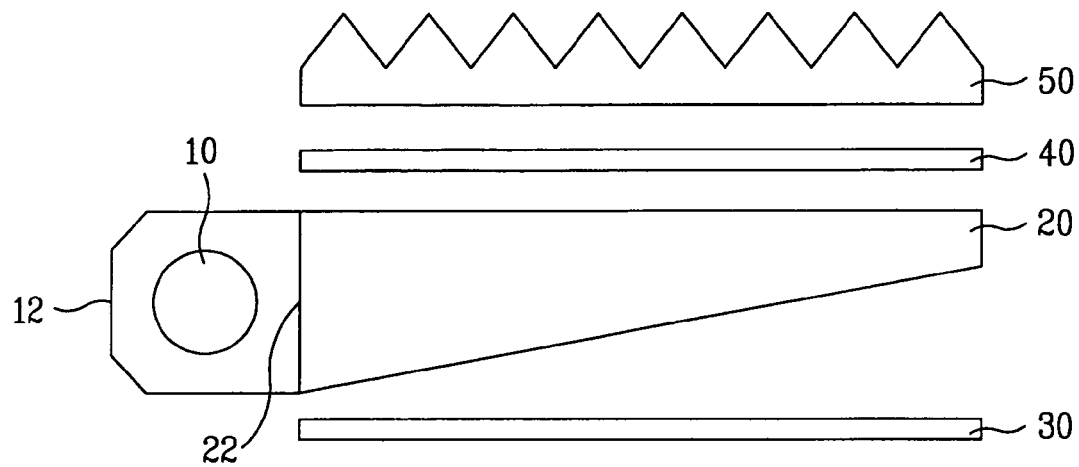
FIG. 1 is a schematic view illustrating a conventional backlight unit.
Figure 2:
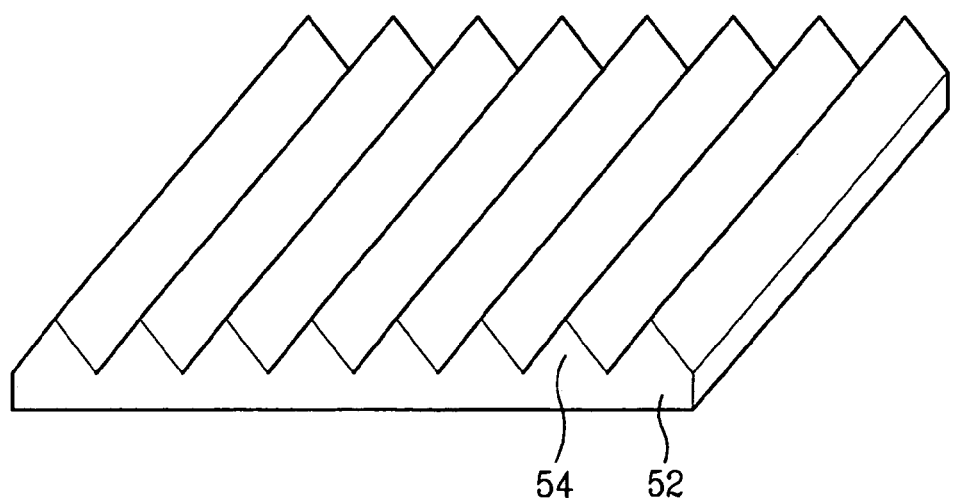
FIG. 2 is a perspective view illustrating the prism sheet shown in FIG. 1.
Figure 3:
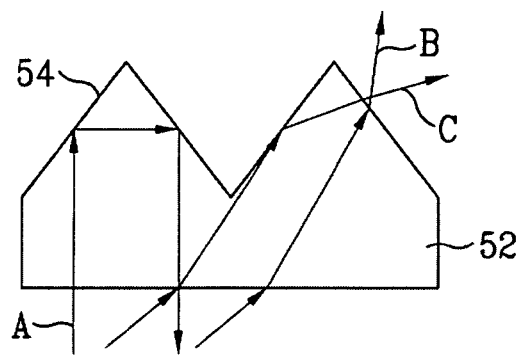
FIG. 3 is a schematic view illustrating optical characteristics of crests of the prism shown in FIG. 2.
Figure 4:
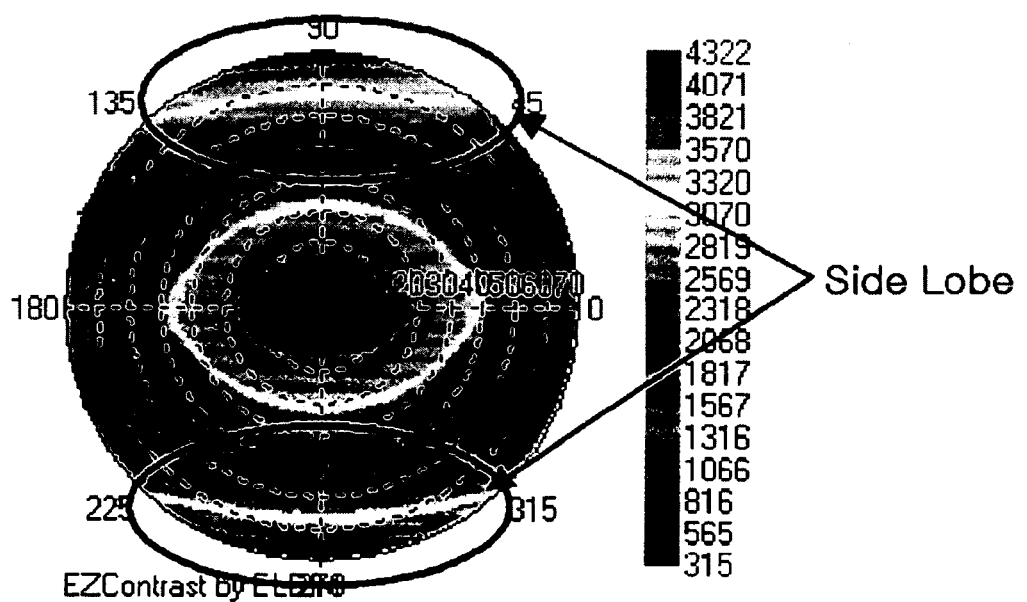
FIG. 4 is a diagram illustrating light transmission and angular light distribution in the prism sheet shown in FIG. 2.
Figure 5:
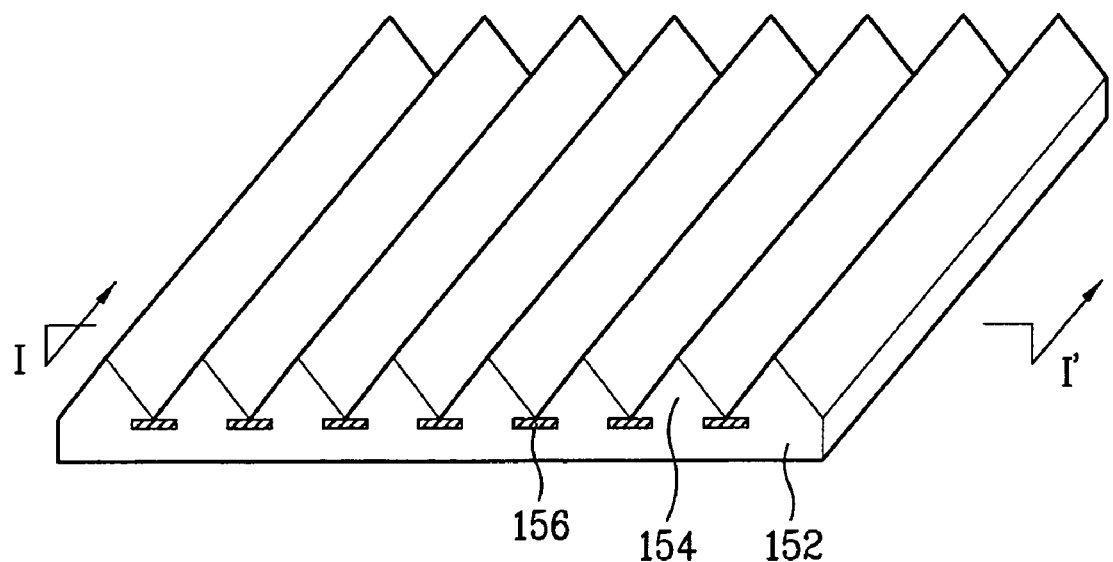
FIG. 5 is a perspective view illustrating a prism sheet according to a first embodiment of the present invention.
Figure 6:
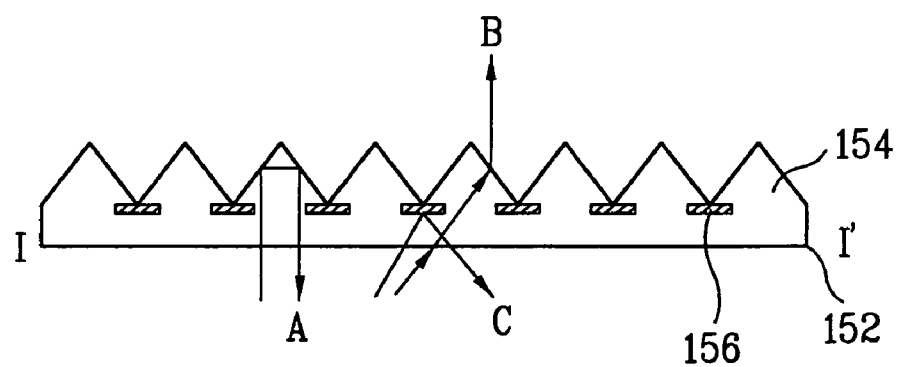
FIG. 6 is a cross-sectional view taken along the line I-I' of FIG. 5, illustrating the path of the light.

FIG. 5 is a perspective view illustrating a prism sheet according to a first embodiment of the present invention. FIG. 6 is a cross-sectional view taken along the line I-I' of FIG. 5, illustrating the path of the light.

Referring to FIGS. 5 and 6, the prism sheet according to the first embodiment of the present invention includes a condensing film 152 to which light is incident from a lower surface of the condensing film 152, and a plurality of prism crests 154 that are formed on an upper surface of the condensing film 152 to extend in parallel in the form of stripes while having apexes. The prism sheet also includes a plurality of reflection patterns 156 formed on the upper surface of the condensing film 152 at regions each corresponding to the boundary of the associated adjacent prism crests 154 (associated prism valley).

The condensing film 152 is made of a transparent material such as polyester (PET).

Each prism crest 154 has first and second inclined surfaces each having a predetermined inclination from the apex of the prism crest 154. For example, each of the first and second inclined faces is inclined by about 45° from the upper surface of the condensing film 152.

Each reflection pattern 156 is formed in the form of a stripe having a rectangular cross-section between the associated adjacent prism crests 154 to extend in parallel to the boundary of the facing first and second inclined surfaces of the associated adjacent prism crests 154, namely, the associated prism valley.

Each reflection pattern 156 is made of a material such as titanium oxide (TiO2) or magnesium oxide (MgO) containing a reflective material to reflect incidence light.

The positions of the reflection patterns 156 may be varied in accordance with the refractive index of the condensing film 152 and the angle of the prism crests 154. Preferably, the central position of each reflection pattern 156 faces the associated prism valley.

Also, the width and thickness of each reflection pattern 156 may be varied in accordance with a desired angle and desired refractive index of the prism crests 154 and desired angular distribution of the emitted light.

As shown in FIG. 6, the prism sheet according to the first embodiment of the present invention may be divided into three regions, namely, a full reflection region, a condensing region, and a side lobe region.

The light in the full reflection region, namely, light A vertically incident to the condensing film 152, is fully reflected by the first and second inclined faces of the prism crests 154 toward the lower surface of the condensing film 152, so that the light A is condensed while being recycled.

The light in the condensing region, namely, light B incident to the condensing film 152 at a certain angle, is refracted by the first and second inclined faces of the prism crests 154, so that the light B is externally emitted after being condensed.

On the other hand, the light in the side lobe region, namely, light C incident to the condensing film 152 at a certain angle, is fully reflected toward the lower surface of the condensing film 152 by the reflection patterns 156, so that the light C is condensed after being recycled to be the light B of the condensing region.

Thus, the prism sheet according to the first embodiment of the present invention removes the light C traveling toward the side lobe region. Accordingly, it is possible to prevent light from leaking into the sidelobes and thus, to improve the light condensing efficiency and the brightness symmetry. As a result, an enhancement in viewing angle characteristics is achieved.

Also, the prism sheet according to the first embodiment of the present invention provides reflection regions preventing the presence of side lobe regions while increasing the mechanical durability of the prism sheet by virtue of the reflection patterns 156 formed on the upper surface of the condensing film 152. Accordingly, an enhancement in light efficiency is achieved.

Figure 7:
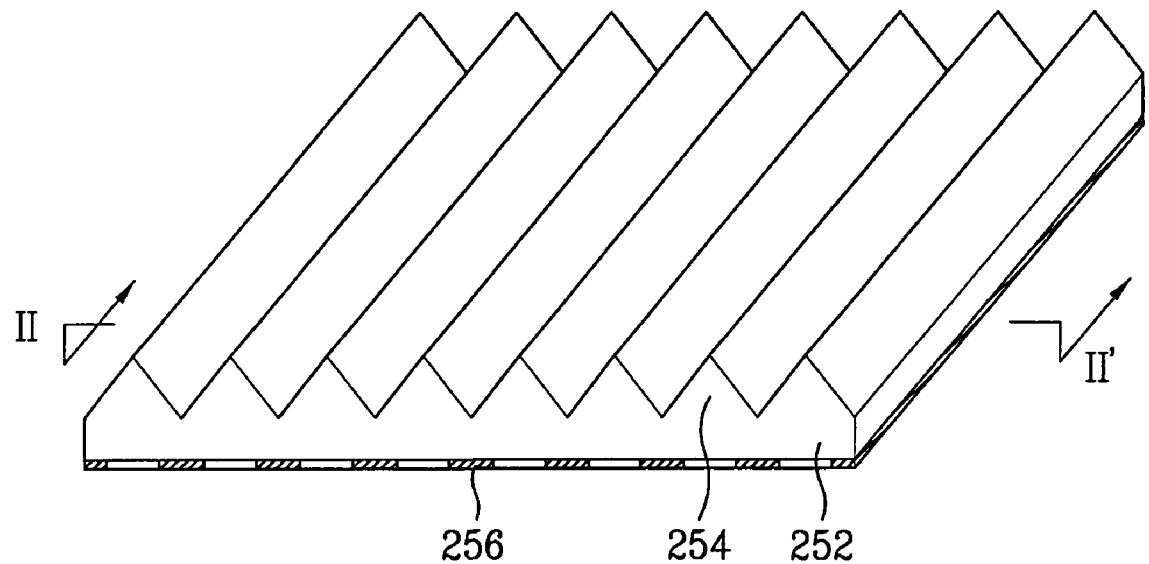
FIG. 7 is a perspective view illustrating a prism sheet according to a second embodiment of the present invention.
Figure 8:
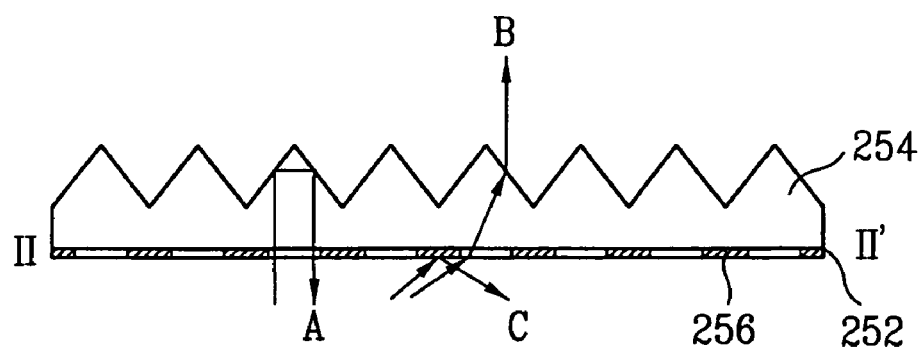
FIG. 8 is a cross-sectional view taken along the line II-II' of FIG. 7, illustrating the path of the light.

FIG. 7 is a perspective view illustrating a prism sheet according to a second embodiment of the present invention. FIG. 8 is a cross-sectional view taken along the line II-II' of FIG. 7, illustrating the path of the light.

Referring to FIGS. 7 and 8, the prism sheet according to the second embodiment of the present invention includes a condensing film 252 to which light is incident from a lower surface of the condensing film 252, and a plurality of prism crests 254 that are formed on an upper surface of the condensing film 252 to extend in parallel in the form of stripes while having apexes. The prism sheet also includes a plurality of reflection patterns 256 formed on the lower surface of the condensing film 252 at regions each corresponding to the boundary of the associated adjacent prism crests 254 (associated prism valley).

The prism sheet according to the second embodiment of the present invention has the same configuration as that of the first embodiment shown in FIG. 5, except that the reflection patterns 256 are formed on the lower surface of the condensing film 252.

Accordingly, the prism sheet according to the second embodiment of the present invention removes the light C traveling toward the side lobe region, namely, light leakage because the reflection patterns 256 are formed on the lower surface of the condensing film 252. Therefore, it is possible to prevent a light leakage phenomenon, and thus, to improve the light condensing efficiency and an enhancement in brightness symmetry. As a result, an improvement in viewing angle characteristics is achieved.

Figure 9:
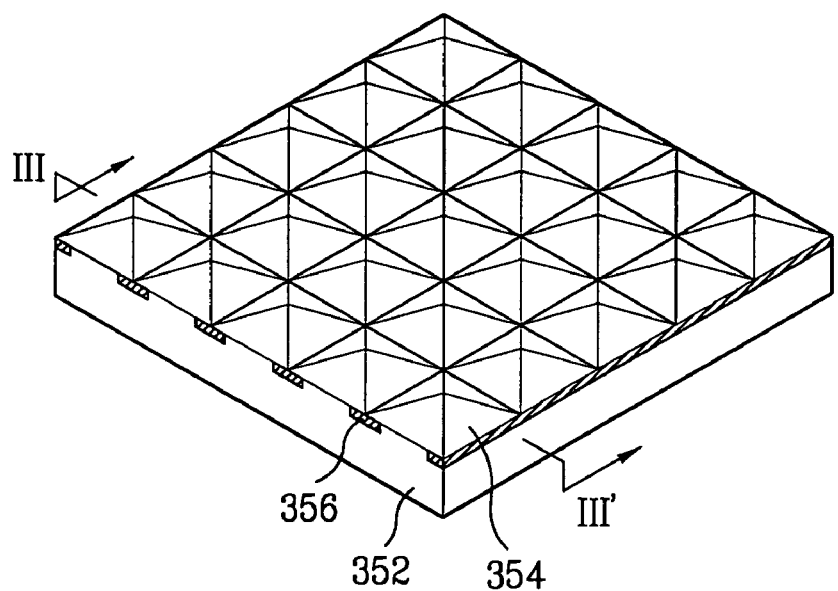
FIG. 9 is a perspective view illustrating a prism sheet according to a third embodiment of the present invention.
Figure 10:
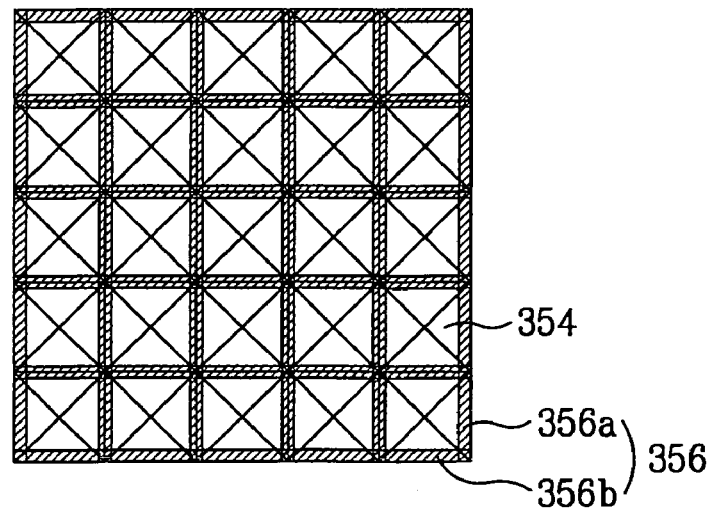
FIG. 10 is a plan view illustrating the prism sheet according to the third embodiment of the present invention.

FIG. 9 is a perspective view illustrating a prism sheet according to a third embodiment of the present invention. FIG. 10 is a plan view illustrating the prism sheet according to the third embodiment of the present invention.

Referring to FIGS. 9 and 10, the prism sheet according to the third embodiment of the present invention includes a condensing film 352 to which light is incident from a lower surface of the condensing film 352, and a plurality of prism crests 354 that are formed on an upper surface of the condensing film 352 in the form of pyramids. The prism sheet also includes a plurality of reflection patterns 356 formed on the upper surface of the condensing film 352 at regions each corresponding to the boundary of the associated adjacent prism crests 354 (associated prism valley).

The condensing film 352 is made of a transparent material such as polyester (PET).

The prism crests 354 are arranged in a matrix array on the upper surface of the condensing film 352. Each prism crest 354 has a pyramid shape having inclined surfaces each having an inclination of about 45° from the upper surface of the condensing film 352.

Each reflection pattern 356 is formed in the form of a stripe having a rectangular cross-section to extend in parallel to the boundary of the associated adjacent prism crests 354, namely, the associated prism valley.

That is, each reflection pattern 356 includes a first reflection pattern 356a which is formed in parallel to a first direction (Y-axis direction) of the condensing film 352 while facing the associated prism valley, and a second reflection pattern 356b which is formed in parallel to a second direction (X-axis direction) orthogonal to the first direction of the condensing film 352.

Each reflection pattern 356 is made of a material such as titanium oxide ($TiO_2$) or magnesium oxide (MgO) containing a reflective material to reflect incident light.

Figure 11:
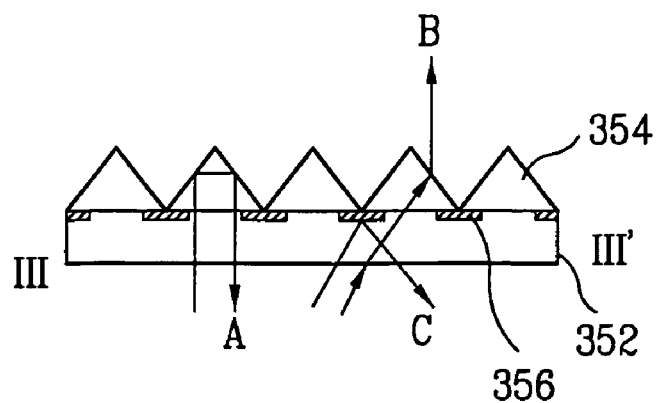
FIG. 11 is a cross-sectional view taken along the line III-III' of FIG. 9, illustrating the traveling direction of light.

As shown in FIG. 11, the prism sheet according to the third embodiment of the present invention may be divided into three regions, namely, a full reflection region, a condensing region, and a side lobe region.

The light in the full reflection region, namely, light A vertically incident to the condensing film 352, is fully reflected by the inclined faces of the prism crests 354 toward the lower surface of the condensing film 352, so that the light A is condensed while being recycled.

The light in the condensing region, namely, light B incident to the condensing film 352 at a certain angle, is refracted by the inclined faces of the prism crests 354, so that the light B is externally emitted after being condensed.

On the other hand, the light in the side lobe region, namely, light C incident to the condensing film 352 at a certain angle, is fully reflected toward the lower surface of the condensing film 352 by the reflection patterns 356, so that the light C is condensed after being recycled to be light B of the condensing region.

Thus, the prism sheet according to the third embodiment of the present invention removes the light C traveling toward the side lobe region because of the reflection patterns 356. Accordingly, it is possible to prevent a light leakage phenomenon, and thus, to improve the light condensing efficiency and the brightness symmetry. As a result, an improvement in viewing angle characteristics is achieved.

Figure 12:
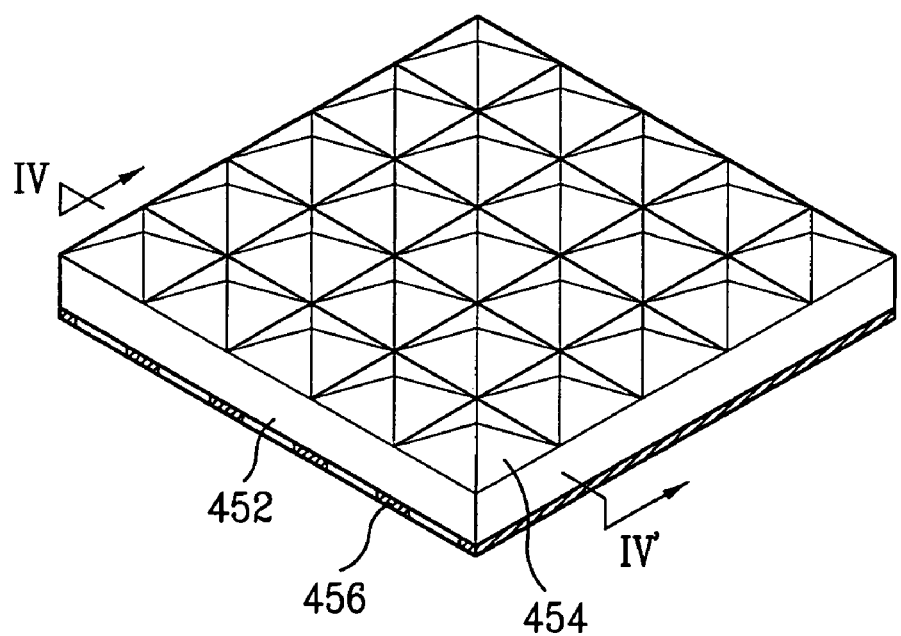
FIG. 12 is a perspective view illustrating a prism sheet according to a fourth embodiment of the present invention.

FIG. 12 is a perspective view illustrating a prism sheet according to a fourth embodiment of the present invention.

Figure 13:
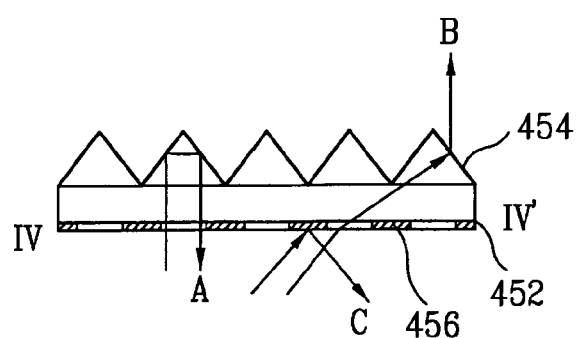
FIG. 13 is a cross-sectional view taken along the line VI-VI' of FIG. 12, illustrating the path of the light.

FIG. 13 is a cross-sectional view taken along the line VI-VI' of FIG. 12, illustrating the traveling direction of light.

Referring to FIGS. 12 and 13, the prism sheet according to the fourth embodiment of the present invention includes a condensing film 452 to which light is incident from a lower surface of the condensing film 452, and a plurality of prism crests 454 that are formed on an upper surface of the condensing film 452 in the form of pyramids. The prism sheet also includes a plurality of reflection patterns 456 formed on a lower surface of the condensing film 452 at regions each corresponding to the boundary of the associated adjacent prism crests 354 (associated prism valley).

The prism sheet according to the fourth embodiment of the present invention has the same configuration as that of the third embodiment shown in FIG. 9, except that the reflection patterns 456 are formed on the lower surface of the condensing film 452.

Accordingly, the prism sheet according to the fourth embodiment of the present invention removes the light C traveling toward the side lobe region because the reflection patterns 456 are formed on the lower surface of the condensing film 452. Therefore, it is possible to prevent a light leakage phenomenon, and thus, to improve the light condensing efficiency and the brightness symmetry. As a result, an improvement in viewing angle characteristics is achieved.

Figure 14:
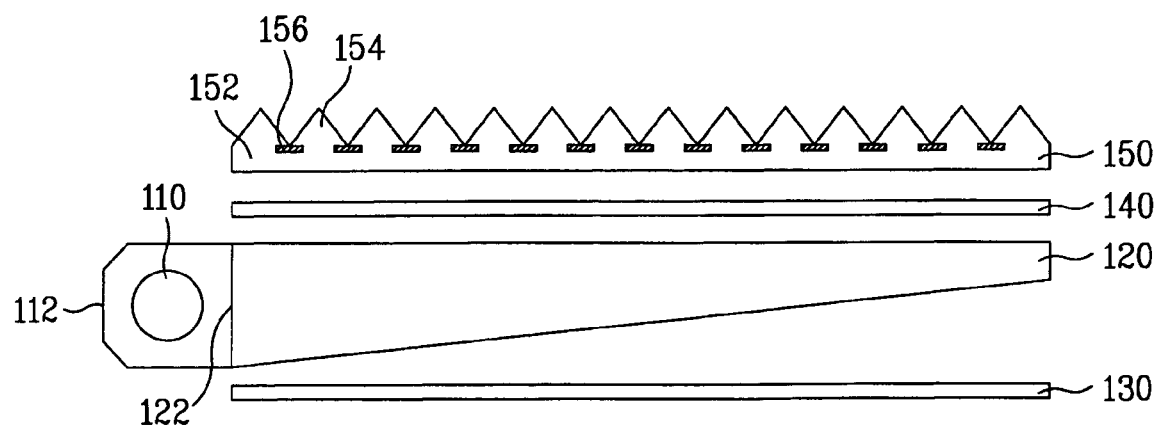
FIG. 14 is a sectional view illustrating a backlight unit according to a first embodiment of the present invention.

FIG. 14 is a sectional view illustrating a backlight unit according to a first embodiment of the present invention.

Referring to FIG. 14, the backlight unit according to the first embodiment of the present invention includes a lamp 110 that emits light, a light guide plate 120 which guides the light incident thereto from the lamp 110 through an incidence face 122 of the light guide plate 120, and a lamp housing 112 which encloses the incidence face 122 of the light guide plate 120 and the lamp 110. The backlight unit also includes a reflection plate 130 that is arranged beneath the light guide plate 120, a diffusion sheet 140 that is arranged on the light guide plate 120 to diffuse light emerging from the light guide plate 120, and a prism sheet 150 that condenses light emerging from the diffusion sheet 140.

For the lamp 110, a cold cathode fluorescent lamp is typically used. The lamp 110 is turned on by a lamp drive voltage supplied from an inverter not shown, to irradiate light to the incidence face 122 of the light guide plate 120 provided at one side of the light guide plate 120.

The lamp housing 112 is arranged at one side of the light guide plate 120 to enclose the lamp 110 and the incidence face 122 of the light guide plate 120. The lamp housing 112 has a reflective inner surface to reflect the light from the lamp 110 toward the incidence face 122 of the light guide plate 120.

The light guide plate 120 enables the incident light from the lamp 110 to reach a position spaced apart from the lamp 110 by a great distance, and guides the incident light toward the diffusion sheet 140.

A printed pattern on an inclined lower surface of the light guide plate 120 forms a reflection face, so that light incident to the incidence face 122 is reflected from the inclined lower surface of the light guide plate 120 at a certain angle such that the light travels uniformly toward the diffusion sheet 140.

The reflection plate 130 is arranged beneath the light guide plate 120 in order to reflect light incident thereto from the reflection face of the light guide plate 120 toward the light guide plate 120, and thus, to reduce the loss of light.

The diffusion sheet 140 diffuses the light emerging from the light guide plate 120 over the entire region of the diffusion sheet 140, and irradiates the diffused light to the prism sheet 150.

The prism sheet 150 includes a condensing film 152 to which light is incident from a lower surface of the condensing film 152, and a plurality of prism crests 154 that are formed on an upper surface of the condensing film 152 to extend in parallel in the form of stripes while having apexes. The prism sheet also includes a plurality of reflection patterns 156 formed on the upper surface of the condensing film 152 at regions each corresponding to the boundary of the associated adjacent prism crests 154 (associated prism valley).

The above-described structure of the prism sheet 150 is identical to that of the prism sheet according to the first embodiment of the present invention shown in FIG. 5. Accordingly, details of the prism sheet 150 will be appreciated by referring to the description given with reference to FIG. 5.

The above-described backlight unit according to the first embodiment of the present invention can remove light traveling toward the side lobe regions of the prism sheet 150 because of the reflection patterns 156 formed on the condensing film 152. Accordingly, it is possible to prevent a light leakage phenomenon, and to improve the light condensing efficiency and the brightness symmetry. Accordingly, an improvement in viewing angle characteristics is achieved.

Meanwhile, for the prism sheet 150 in the backlight unit according to the first embodiment of the present invention, any one of the prism sheets shown in FIGS. 7, 9 and 12 may be used.

Figure 15:
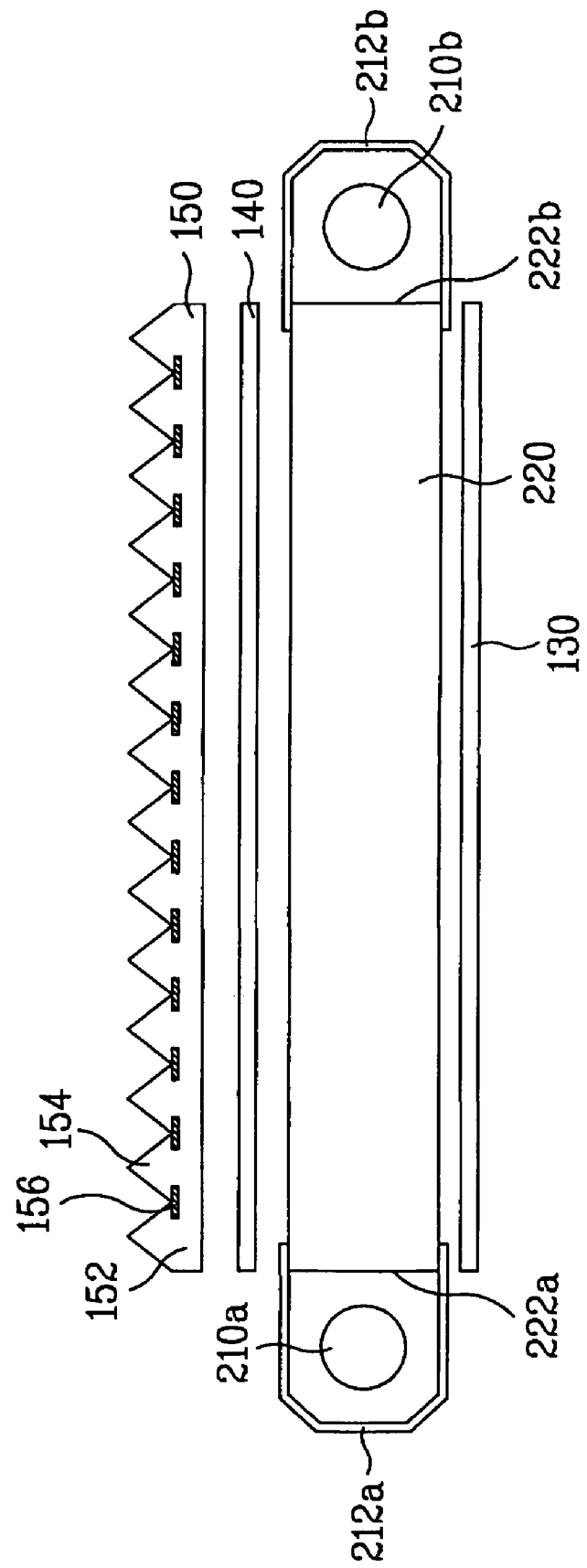
FIG. 15 is a sectional view schematically illustrating a backlight unit according to a second embodiment of the present invention.

FIG. 15 is a sectional view schematically illustrating a backlight unit according to a second embodiment of the present invention.

Referring to FIG. 19, the backlight unit according to the second embodiment of the present invention includes a light guide plate 220 having a flat plate structure, lamps 210a and 210b that face incidence faces 222a and 222b formed at opposite sides of the light guide plate 220, respectively, and lamp housings 212a and 212b which enclose the incidence faces 222a and 222b of the light guide plate 220 and the lamps 210a and 210b, respectively. The backlight unit also includes a reflection plate 130 that is arranged beneath the light guide plate 220, a diffusion sheet 140 that is arranged on the light guide plate 220 to diffuse light emerging from the light guide plate 220, and a prism sheet 150 that condenses light emerging from the diffusion sheet 140.

The above-described backlight unit according to the second embodiment of the present invention has the same configuration as that of the first embodiment shown in FIG. 14, except for the light guide plate 220 and the lamps 210a and 210b arranged to face the opposite sides of the light guide plate 220.

The backlight unit according to the second embodiment of the present invention can greatly enhance the brightness of externally-emitted light because light is incident to the light guide plate 220 at opposite sides thereof using the lamps 210a and 210b.

The above-described backlight unit according to the second embodiment of the present invention can remove light traveling toward the side lobe regions of the prism sheet 150 because of the reflection patterns 156 formed on the condensing; film 152. Accordingly, it is possible to prevent a light leakage phenomenon, and to improve the light condensing efficiency and the brightness symmetry. Accordingly, an improvement in viewing angle characteristics is achieved.

Meanwhile, for the prism sheet 150 in the backlight unit according to the second embodiment of the present invention, any one of the prism sheets shown in FIGS. 7, 9 and 12 may be used.

Figure 16:
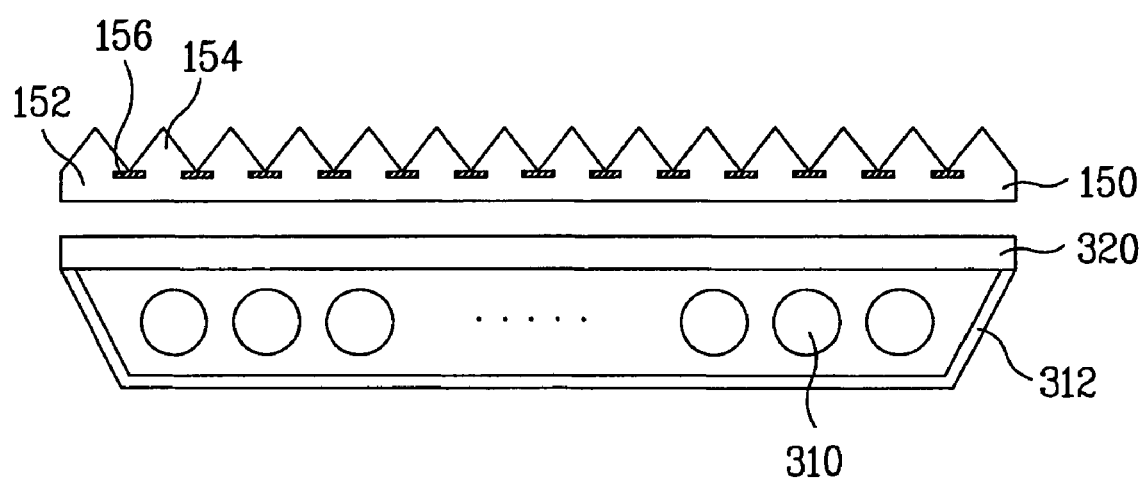
FIG. 16 is a sectional view illustrating a backlight unit according to a third embodiment of the present invention.

FIG. 16 is a sectional view illustrating a backlight unit according to a third embodiment of the present invention.

Referring to FIG. 16, the backlight unit according to the third embodiment of the present invention includes a plurality of lamps 310 that emit light, a bottom cover 312 that receives the lamps 310, a diffusion plate 320 that covers an upper surface of the bottom cover 312 and diffuses light incident from the lamps 310 over the entire region of the diffusion plate 320, and a prism sheet 150 that is arranged over the diffusion plate 320 to condense light emerging from the diffusion plate 320.

For each lamp 310, a cold cathode fluorescent lamp is typically used. The lamps 310 are turned on by a lamp drive voltage supplied from an inverter not shown to irradiate light to a lower surface of the diffusion plate 320.

The bottom cover 312 receives and supports the lamps 310. A reflection sheet not shown is attached to an inner surface of the bottom cover 312, in order to reflect light incident from the lamps 310 toward the diffusion plate 320.

The diffusion plate 320 is arranged to cover the upper surface of the bottom cover 312. The diffusion plate 320 diffuses light incident from the lamps 310 and the reflection sheet of the bottom cover 312 over the entire region of the diffusion plate 320, and irradiates the diffused light to the prism sheet 150.

The prism sheet 150 includes a condensing film 152 to which light emerging from the diffusion plate -320 is incident, and a plurality of prism crests 154 which are formed on an upper surface of the condensing film 152 to extend in parallel in the form of stripes while having apexes, respectively. The prism sheet also includes a plurality of reflection patterns 156 formed on the upper surface of the condensing film 152 at regions each corresponding to the boundary of the associated adjacent prism crests 154 (associated prism valley).

The above-described structure of the prism sheet 150 is identical to that of the prism sheet according to the first embodiment of the present invention shown in FIG. 5. Accordingly, details of the prism sheet 150 will be appreciated by referring to the description given with reference to FIG. 5.

The backlight unit according to the third embodiment of the present invention can greatly enhance the brightness of externally-emitted light because the light from the lamps 310 is directly irradiated to the lower surface of the diffusion plate 320. Also, the backlight unit according to the third embodiment of the present invention can remove light traveling toward the side lobe regions of the prism sheet 150 because of the reflection patterns 156 formed on the condensing film 152. Accordingly, it is possible to prevent a light leakage phenomenon, and to improve the light condensing efficiency and the brightness symmetry. Accordingly, an improvement in viewing angle characteristics is achieved.

For the prism sheet 150 in the backlight unit according to the third embodiment of the present invention, any one of the prism sheets shown in FIGS. 7, 9 and 12 may be used.

Meanwhile, the backlight unit according to any one of the first through third embodiment of the present invention can be used as a light source for an LCD device.

As apparent from the above description, in a prism sheet according to any one of the above-described embodiments of the present invention and the backlight unit using the same, reflection patterns are formed on an upper or lower surface of a condensing film formed with a plurality of prism crests at regions corresponding to respective prism valleys. Accordingly, it is possible to remove light of side lobe regions, and thus, to prevent a light leakage phenomenon. As a result, it is possible to achieve an enhancement in light condensing efficiency and an enhancement in brightness symmetry, and thus, to achieve an enhancement in viewing angle characteristics.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A prism sheet comprising:
   a condensing film which transmits light incident to the condensing film;
   a plurality of prism crests on the condensing film, each prism crest having a pair of sloping sides that intersect to form an apex of the prism crest, and wherein facing sloping sides of adjacent ones of the prism crests define valleys between the adjacent ones of the prism crests on the condensing film; and
   a plurality of reflection patterns formed on the condensing film such that each of the reflection patterns faces and overlaps a valley between adjacent prism crests to reflect light incident onto the reflection patterns,
   wherein there is a one to one correspondence between the reflection patterns and the valleys between adjacent prism crests.

2. The prism sheet according to claim 1, wherein each of the prism crests has one of a strip shape and a pyramid shape.

3. The prism sheet according to claim 1, wherein the reflection patterns are formed on one of an upper surface and a lower surface of the condensing film.

4. The prism sheet according to claim 1, wherein the reflection patterns are arranged in the form of one of stripes and a matrix array.

5. The prism sheet according to claim 1, wherein the reflection patterns are made of one of titanium oxide ($TiO_2$) and magnesium oxide (MgO).

6. A backlight unit comprising:
   a lamp that emits light;
   a light guide plate that receives the light emitted from the light, and changes a path direction of the light to a direction substantially perpendicular to an upper surface of the light guide plate; and
   a prism sheet that condenses the light emerging from the light guide plate,
   wherein the prism sheet includes:
   a condensing film that transmits the light emerging from the light guide plate;
   a plurality of prism crests on the condensing film, each prism crest havina a pair of sloping sides that intersect to form an apex of the prism crest, and wherein facing sloping sides of adjacent ones of the prism crests define valleys between the adjacent ones of the prism crests on the condensing film; and
   a plurality of reflection patterns formed on the condensing film such that each of the reflection patterns faces and overlaps a valley between adjacent prism crests associated with the reflection pattern to reflect light incident onto the reflection patterns,
   wherein there is a one to one correspondence between the reflection patterns and the valleys between adjacent prism crests.

7. The backlight unit according to claim 6, wherein the lamp includes one of a lamp arranged at one side of the light guide plate and a pair of lamps respectively arranged at opposite sides of the light guide plate.

8. The backlight unit according to claim 6, further including:
- at least one lamp housing arranged at one of one side and opposite sides of the light guide plate to enclose an incidence face of the light guide plate and the lamp;
- a diffusion sheet arranged between the light guide plate and the prism sheet to diffuse the light emerging from the light guide plate; and
- a reflection plate arranged beneath a lower surface of the light guide plate.

9. The backlight unit according to claim 6, wherein each of the prism crests has one of a strip shape and a pyramid shape.

10. The backlight unit according to claim 6, wherein the reflection patterns are formed on one of an upper and a lower surface of the condensing film.

11. The backlight unit according to claim 10, wherein the reflection patterns are arranged in the form of one of stripes and a matrix array.

12. The backlight unit according to claim 6, wherein the reflection patterns are made of one of titanium oxide ($TiO_2$) and magnesium oxide (MgO).

13. A backlight unit comprising:
- a plurality of lamps that emit light;
- a bottom cover that receives and supports the lamps;
- a diffusion plate that covers an upper surface of the bottom cover and diffuses light emitted from the lamps; and
- a prism sheet that condenses light emerging from the diffusion plate,
- wherein the prism sheet includes:
- a condensing film that transmits the light emerging from the light guide plate;
- a plurality of prism crests on the condensing film, each prism crest having a pair of sloping sides that intersect to form an apex of the prism crest, and wherein facing sloping sides of adjacent ones of the prism crests define valleys between the adjacent ones of the prism crests on the condensing film; and
- a plurality of reflection patterns formed on the condensing film such that each of the reflection patterns faces and overlaps a valley between adjacent prism crests associated with the reflection pattern to reflect light incident onto the reflection patterns,
- wherein there is a one to one correspondence between the reflection patterns and the valleys between adjacent prism crests.

14. The backlight unit according to claim 13, wherein each of the prism crests has one of a strip shape and a pyramid shape.

15. The backlight unit according to claim 13, wherein the reflection patterns are formed on one of an upper or a lower surface of the condensing film.

16. The backlight unit according to claim 15, wherein the reflection patterns are arranged in the form of one of stripes and a matrix array.

17. The backlight unit according to claim 13, wherein the reflection patterns are made of one of titanium oxide ($TiO_2$) and magnesium oxide (MgO).

18. A prism sheet comprising:
- a condensing film that transmits light incident to the condensing film;
- a plurality of prism crests on the condensing film, each prism crest having a pair of sloping sides that intersect to form an apex of the prism crest, and wherein facing sloping sides of adjacent ones of the prism crests define valleys between the adjacent ones of the prism crests on the condensing film; and
- a plurality of reflection patterns formed on the condensing film such that each of the reflection patterns is aligned with and overlaps each valley defined between adjacent prism crests associated with the reflection pattern to reflect light incident onto the reflection patterns,
- wherein there is a one to one correspondence between the reflection patterns and the valleys between adjacent prism crests.

* * * * *